Jan. 21, 1930.                W. LA HODNY                1,744,316
                              REAR VIEW MIRROR
                           Filed June 19, 1926
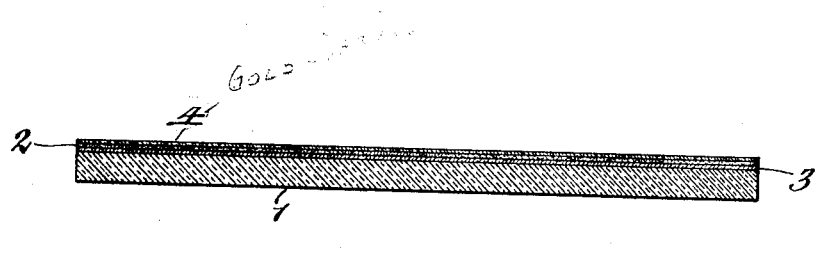
Inventor
William La Hodny
By Popp & Powers
Attorneys Patented Jan. 21, 1930

1,744,316

UNITED STATES PATENT OFFICE

WILLIAM LA HODNY, OF BUFFALO, NEW YORK, ASSIGNOR TO STANDARD MIRROR COMPANY INC., OF BUFFALO, NEW YORK, A CORPORATION OF NEW YORK

REAR-VIEW MIRROR

Application filed June 19, 1926. Serial No. 117,090.

This invention relates to a mirror which is more particularly designed for use as a rear view mirror on automobiles, buses, motorcycles, motor boats and similar installations where it is necessary to obtain a view of the road in front and in rear at the same time for safety.

As is well-known, the rays of light which are reflected by a silvered or mercury coated mirror are annoying because the same produce a double reflection and are also dangerous, particularly during night driving when the bright rays of light from high powered headlights on a car in the rear are reflected by the mirror into the eyes of the driver and render him practically blind for a time, thereby endangering life and property on the roadway in the path of the car when the driver loses control of the same while blinded.

It has been proposed heretofore to meet this difficulty by employing screens or shades which were drawn down in front of the mirror to reduce or eliminate reflected light. This is objectionable on account of the additional cost and also because it either eliminated the desired vision entirely or partially obscured the same to an objectionable extent.

Another method equally unsatisfactory to meet this difficulty consisted in employing colored glass, but the same does not present a clear vision and when silvered, produces the objectionable double reflection above referred to and is therefore to be avoided. Black or very dark glass has also been employed with no better results because the vision obtained is not clear and distinct.

To overcome the objectionable blinding effect on the eyes of the driver it has been the practice to temporarily tilt the rear view mirror so that the rays of reflected light will be out of the line of vision when a car approaches from the rear and then restore the mirror to its normal position after the objectionable conditions have terminated, but this is a dangerous procedure because the driver must take at least one hand off the steering wheel to effect such adjustment of the mirror and he is also apt to take his eyes off the road and is otherwise distracted which is highly dangerous, particularly in cases of an emergency.

It is the object of this invention to provide a rear view mirror in which the light rays are toned down so as to give a clear and distinct vision instead of distorting or obscuring the vision and without producing an annoying double reflection or a blinding glaring reflection on the eyes of the driver. The accompanying drawing represents a cross section of a mirror constructed in accordance with my invention.

This invention consists generally in plating the rear of the transparent glass body 1 with a coating 2 of material which is reflectant but has the effect of toning down the light rays so that the same do not reflect double and are not so bright as to produce a blinding effect and still present a clear reflection of an image.

It is preferable to employ for this purpose, a metal having this softening and toning down property such as gold, copper or the like.

In order to utilize gold for this purpose, the back of the transparent or clear glass plate is first cleaned and then treated with a priming coat 3 of muriate of tin dissolved in water for the purpose of causing adherence thereto of the gold which is subsequently applied thereto.

The preparation of the gold for this purpose is effected by dissolving chlorid of gold salts in water and mixing the same with an alkaline clarifying solution such as potassium carbonate or sodium carbonate dissolved in distilled water. This mixture is poured over the previously cleaned and primed back side of the glass plate and then the latter is allowed to stand a sufficient length of time to permit the gold in the mixture to precipitate and form a fine screen like or transparent coating on the back of the glass. The remainder of the solution is now poured off the glass plate and the gold coating 4 is covered by a heavy coating of metallic silver the deposit of which is effected by a solution of nitrate of silver which not only holds the gold in place but also provides the agent whereby the rays of light are reflected and the mirror is completed for practical use.

A mirror made in accordance with the above method, avoids the objectionable features inherent in a silvered or mercury coated mirror inasmuch as it permits a person to look directly into the mirror without experiencing any bad effects on the eyes from the light rays which are reflected from head lights even though the same may have high powered lamps. The objections which have been urged against mirrors of the type heretofore known are therefore entirely eliminated thereby rendering night driving agreeable and ensuring safety to persons and property.

I claim as my invention:

1. A mirror having a transparent body, a fine coating of gold deposited on the back of said body and forming a transparent screen like non-glaring reflecting surface thereon, and a coating of metallic silver applied to the back of said gold coating and visible through the interstices thereof and having its glare reduced by said gold coating.

2. A mirror comprising a transparent body, a fine coat of gold deposited on the back of said body and forming a transparent screen-like non-glaring reflecting surface thereon, and a metallic coating deposited on the back of said gold coating and visible through the interstices thereof and having its glare reduced by said gold coating.

3. A mirror comprising a transparent body, a fine coat of relatively dark metal deposited on the back of said body and forming a transparent screenlike surface thereon which is nonglaring, and a coating of relatively light metal deposited on the back of said non-glare coating and visible through the interstices of the dark metal so as to reduce the glare of said light coating.

In testimony whereof I hereby affix my signature.

WILLIAM LA HODNY.